United States Patent [19]
Morimoto et al.

[11] Patent Number: 5,397,656
[45] Date of Patent: Mar. 14, 1995

[54] DIFFERENTIAL PRESSURE CONTROLLING METHOD AND APPARATUS FOR PLATE REFORMER OF FUEL CELL POWER GENERATION SYSTEM

[75] Inventors: Hiromasa Morimoto, Tokyo; Hiroyoshi Uematsu, Yokohama; Satoshi Hatori, Kita-Soma, all of Japan

[73] Assignee: Ishikawajima-Harima Heavy Industries Co., Ltd., Tokyo, Japan

[21] Appl. No.: 247,314

[22] Filed: May 23, 1994

[30] Foreign Application Priority Data

Jul. 9, 1993 [JP] Japan .................. 5-192960

[51] Int. Cl.$^6$ .................. H01M 8/04
[52] U.S. Cl. .................. 429/17; 429/19; 429/25
[58] Field of Search .................. 429/12, 13, 16, 17, 429/19, 25, 34

[56] References Cited

U.S. PATENT DOCUMENTS

| | | | |
|---|---|---|---|
| 4,904,547 | 2/1990 | Mizumoto et al. | 429/25 X |
| 5,039,579 | 8/1991 | Kinoshita | 429/19 |
| 5,059,494 | 10/1991 | Vartanian et al. | 429/17 |
| 5,100,743 | 3/1992 | Narita et al. | 429/19 |
| 5,221,586 | 6/1993 | Morimoto et al. | 429/20 |
| 5,340,663 | 8/1994 | Buswell et al. | 429/17 |

Primary Examiner—Anthony Skapars
Attorney, Agent, or Firm—Trexler, Bushnell, Giangiorgi & Blackstone, Ltd.

[57] ABSTRACT

The method controls a differential pressure of a plate reformer installed in a fuel cell power generation system. In the power generation system, a raw material gas is reformed to a fuel gas in the plate reformer, the fuel gas is fed to an anode of a fuel cell, an anode exhaust gas from the anode is fed to a combustion chamber of the plate reformer a combustion exhaust gas from the combustion chamber is fed to a cathode of the fuel cell together with an air, and part of the air is fed to the combustion chamber. The method includes the steps of placing the plate reformer in a pressure vessel, maintaining a pressure of a cathode exhaust gas to a constant value, feeding part of the air to be fed to the cathode and all of the anode exhaust gas into the combustion chamber to make a pressure of the air and that of the anode exhaust gas substantially the same so as to make a pressure of the reforming chamber and that of the combustion chamber substantially the same, and forming an opening on a line which feeds the air into the combustion chamber to allow the air to enter the pressure vessel so as to make the pressure of the reforming chamber, that of the combustion chamber and that of the pressure vessel substantially the same.

20 Claims, 3 Drawing Sheets

DIFFERENTIAL PRESSURE CONTROLLING METHOD AND APPARATUS FOR PLATE REFORMER OF FUEL CELL POWER GENERATION SYSTEM

BACKGROUND OF THE INVENTION

1. Technical Field

The present invention relates to a fuel cell power generation system which directly converts chemical energy of a fuel into electrical energy, and more particularly to a method of controlling a differential pressure of a plate reformer which is installed in the power generation system to reform the raw material to a fuel gas and feed the fuel gas into an anode of a fuel cell.

2. Background Art

Among various types of fuel cell power generation system, one of typical power generation systems incorporating a molten carbonate fuel cell utilizes a natural gas as a raw material gas. A fundamental structure of such a fuel cell power generation system will be described with reference to FIG. 4 of the accompanying drawings.

A fuel cell FC is a stack fuel cell elements which are piled up with separators being interposed. Each cell element includes an electrolyte plate (tile) 1, a cathode (electrode) 2 and an anode (electrode) 3, and the tile 1 is sandwiched by these electrodes 2 and 3. An air line 4 extends to the cathode 2 and an air A pressurized by a compressor 5 is introduced to the cathode 2 via an air preheater 6 through the air line 4. Gases discharged from the cathode 2 (called "cathode exhaust gas") flow in the air preheater 6 and a steam generator (not shown) before being expelled to the atmosphere.

A natural gas NG is used as a raw material gas in this power generation system. The natural gas NG is desulfurized by a desulfurizer (not shown) and mixed with a steam $H_2O$. This mixture is introduced to a natural gas feed line 7 and flows in a natural gas preheater 8 and a reforming chamber 9a of a reformer 9 in turn. The natural gas becomes a fuel gas as it is reformed in the reforming chamber 9a. The fuel gas flows in a fuel gas feed line 10 and the natural gas preheater 8 before it reaches the anode 3. Gases discharged from the anode 3 (called "anode exhaust gas") are introduced to a combustion chamber 9b of the reformer 9 by an anode exhaust gas line 11. In the combustion chamber 9b, combustible components in the anode exhaust gas are burned with the air fed from a line 12 branched from the air line 4. A combustion exhaust gas which contains $CO_2$ and is discharged from the combustion chamber 9b proceeds to a heat exchanger 13 and a recycle blower 14. The exhaust gas is pressurized by the blower 14 and supplied to the cathode 2 together with the air. "M" indicates a motor.

Flow rate control valves 15 and 17 are provided on the air feed line 4 and the natural gas feed line 7, respectively. These valves 15 and 17 are connected with flow rate controllers 16 and 18, respectively, and these controllers are connected with a master controller (not shown) such that the air flow rate and the fuel flow rate are adjusted in accordance with a required output of the fuel cell FC.

Recently, a plate reformer is used as the reformer 9 since the plate type one is compact and uniform combustion, which in turn results in effective reformation, can be expected in all over the combustion chamber 9b.

A conventional plate reformer is categorized into two types: air dispersion type and fuel dispersion type. An air is dispersed in the fuel in the former type and a fuel is dispersed in an air in the latter type. One example of the former type is disclosed in Japanese Utility Model Application, Publication No. 2-37739 and that of the latter type is disclosed in Japanese Utility Model Registration No. 1,952,542. As illustrated in FIG. 5 of the accompanying drawings, the plate reformer of the air dispersion type includes a plurality of reforming chamber 9a and combustion chambers 9b piled up with heat transfer walls 21. A reforming catalyst 19 is placed in the reforming chamber 9a. The combustion chamber 9b is divided into two sub-chambers (a catalyst chamber 20b and an air dispersion chamber 23) by an air dispersion plate 22. The air dispersion plate 22 has a number of dispersion openings. A combustion catalyst 20 is placed in the catalyst chamber 20b. An air A is fed to the catalyst chamber 20b from the air dispersion chamber 23 through the openings of the air dispersion plate 22. The reforming chamber 9a and the combustion chamber 9b are shaped like plates, respectively. These chambers are piled up and welded to each other at their peripheries to form a single plate reformer of air dispersion type. The fuel F is fed to the catalyst chamber 20b of the combustion chamber 9b and the air A is fed to the catalyst chamber 20b from the air dispersion chamber 23 via the dispersion plate 22 so that the air A disperses within the fuel F in the catalyst chamber 20b while being combusted. Then, a combustion exhaust gas CG is discharged from the catalyst chamber 20b (or the combustion chamber 9b). Heat generated upon combustion in the combustion chamber 9b is transferred to the reforming chamber 9a via the heat transfer wall 21 and used as a heat source for the reforming reaction. The raw material gas NG is reformed in the reforming chamber 9a and discharged as a reformed gas A plate reformer of fuel dispersion type is obtained by feeding the fuel F to the dispersion chamber 23 and feeding the air A to the catalyst chamber 20b.

The plate reformer 9 installed in the above-described fuel cell power generation system includes a plurality of flat elements joined with each other by the welding so that if a differential pressure between the reforming chamber 9a and the combustion chamber 9b and that between the inside of the reformer 9 and the outside of the same become too large, the welding cannot bear the differential pressure. Therefore, the differential pressures should be suppressed under prescribed values, respectively.

One pressure difference controlling method is schematically illustrated in FIG. 6 of the accompanying drawings. This method may be applied to controlling the pressure difference between the reforming chamber 9a and the combustion chamber 9b and that between the inside and outside of the reformer 9. As shown in FIG. 6, the plate reformer 9 is placed in a pressure vessel 24, a differential pressure meter 25 is provided between an exit of the reformer chamber 9a and an entrance of the combustion chamber 9b, another differential pressure meter 26 is provided between an entrance of the reforming chamber 9a and an exit of the combustion chamber 9b, a differential pressure control valve 27 is provided to adjust a flow rate of a gas from the exit of the reforming cabinet 9a upon receiving an instruction from the differential pressure meter 25, and another differential pressure control valve 28 is provided to adjust a flow rate of a combustion exhaust gas upon receiving an instruction from the differential pressure meter 26. In addition, differential pressure control valves 31 and 32 are provided on a fluid feed line 29 and a fluid discharge line 30 to control a pressure inside the pressure vessel 24. Further, a differential pressure meter 33 is provided to detect a differential pressure between the entrance of the combustion chamber 9b and the inside of the pressure vessel 24, and another differential pressure meter 34 is provided to detect a differential pressure between the exit of the combustion chamber 9b and the inside of the pressure vessel 24. The differential pressure control value 31 is controlled by the differential pressure meter 33 and the differential pressure control valve 32 is controlled by the differential pressure meter 34.

However, the above-described conventional method using the differential pressure control valves cannot insure that the differential pressure always stays in a predetermined range when a trouble occurs in the valves 27, 28, 31 and 32, the differential pressure meters 25, 26, 33 and 34, an air feed line, a power source or other components. Therefore, the conventional method has a problem in reliability and a large expense should be used to these components.

Another differential pressure method is known which is applied to controlling of a differential pressure between the anode and cathode of the fuel cell: the anode exhaust gas and the cathode exhaust gas are both introduced to a catalyst combustor and mixed therein so that the gas pressure of these gases made equal to each other. However, it is difficult to simultaneously control a differential pressure between the reforming chamber and combustion chamber of the plate reformer.

SUMMARY OF THE INVENTION

An object of the present invention is to provide a method of controlling a differential pressure between reforming chamber and combustion chamber of a plate reformer of a fuel cell power generation system and that between inside and outside of the plate reformer without using a valve in controlling a differential pressure.

Another object of the present invention is to provide a fuel cell power generation system which allows an easy control of a differential pressure of a plate reformer as well as a differential pressure between anode and cathode of a fuel cell at the same time.

According to one aspect of the present invention, there is provided a method of controlling a differential pressure of a plate reformer used in a fuel cell power generation system, a raw material gas being reformed to a fuel gas by the plate reformer, the fuel gas being fed to an anode of the fuel cell from a reforming chamber of the plate reformer, an anode exhaust gas being fed to a combustion chamber of the plate reformer from the anode, a combustion exhaust gas being fed to a cathode of the fuel cell from the combustion chamber together with an air, part of the air or part of a cathode exhaust gas being fed to the combustion chamber, characterized in that the plate reformer is placed in a pressure vessel, a pressure of the cathode exhaust gas is maintained to a constant value, part of the air introduced to the cathode and the anode exhaust gas are fed to the combustion chamber to make the pressures of these gases equal to each other so that the pressure of the reforming chamber and that of the combustion chamber become equal to each other, and an opening is formed on a line introducing the air into the combustion chamber for allowing the air in the line to enter the pressure vessel to make the reforming chamber, the combustion chamber and the pressure vessel have substantially the same pressure.

DETAILED DESCRIPTION OF THE PREFERRED EMBODIMENTS

Now, preferred embodiments of the present invention will be described with reference to FIGS. 1 to 3 of the accompanying drawings.

Figure 1:
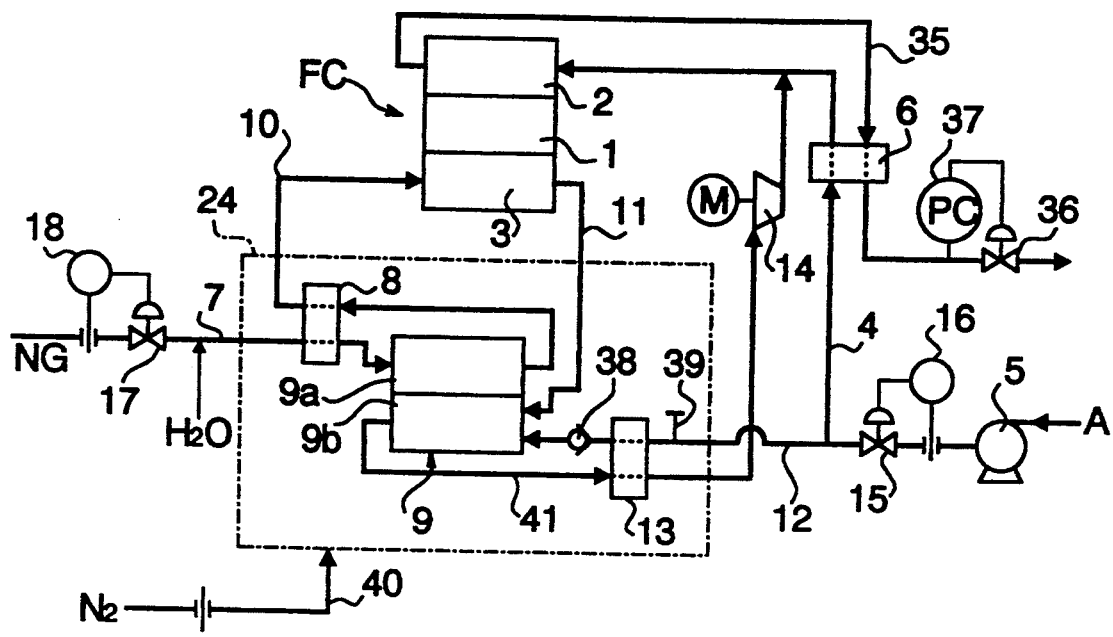
FIG. 1 shows a schematic diagram of a power generation system according to the present invention.
Figure 4:
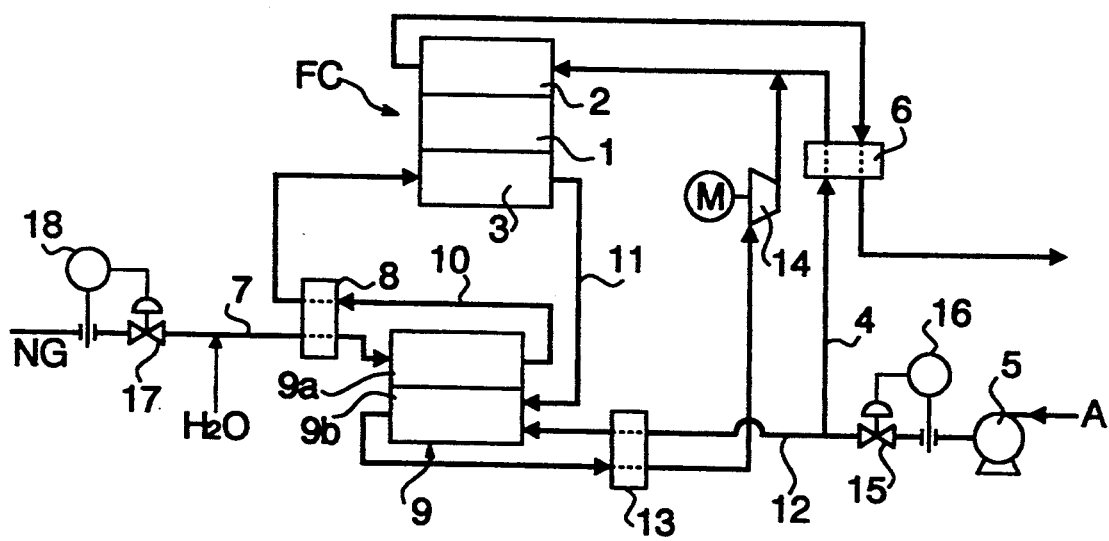
FIG. 4 illustrates a conventional fuel cell power generation system using a natural gas as a raw material gas.

A fundamental structure of a power generation system illustrated in FIG. 1 is the same as that of the system illustrated in FIG. 4.

Specifically, a fuel cell FC includes a stack of fuel cell elements piled up with separators. Each cell element includes an electrolyte plate (tile) 1, a cathode (electrode) 2 and an anode (electrode) 3, and the tile is sandwiched by these electrodes.

An air feed line 4 is connected with the cathode 2 of the fuel cell FC and an air A pressurized by a compressor 5 is introduced to the cathode 2 via an air preheater 6b through a line 4. A cathode exhaust gas discharged from the cathode 2 flows in the air preheater 6 and a steam generator (not shown) before expelled to the atmosphere. A natural gas NG is used as a raw material gas. The natural gas NG is desulfurized by a desulfurizer (not shown) and mixed with a steam $H_2O$ and this mixture flows in a natural gas feed line 7 to be fed to a natural gas preheater 8 and a reforming chamber 9a of a reformer 9. The raw material gas NG is reformed in the reforming chamber 9a and becomes a fuel gas. The fuel gas flows in a fuel gas feed line 10 and is introduced to the natural gas preheater 8 and the anode 3. An anode exhaust gas from the anode 3 flows in an anode exhaust gas line 11 to be fed to a combustion chamber 9b of the reformer 9. In the combustion chamber 9b, a combustible component among the anode exhaust gas is burned with the air fed from a branch line 12. This line 12 is branched from the air feed line 4. A combustion exhaust gas discharged from the combustion chamber 9b which contains $CO_2$ flows through a heat exchanger 13 to reach a recycle blower 14. The combustion exhaust gas is pressurized by the blower 14 and fed to the cathode 2 together with the air fed from the air feed line 4. "M" indicates a motor.

Flow rate control valves 15 and 17 and their controllers 16 and 18 are provided on the air feed line 4 and the natural gas feed line 7, respectively. The flow rate controllers 16 and 18 are connected with a master controller (not shown) to receive instructions in adjusting the air flow rate and the fuel flow rate which are determined in accordance with a required output of the fuel cell FC.

Figure 5:
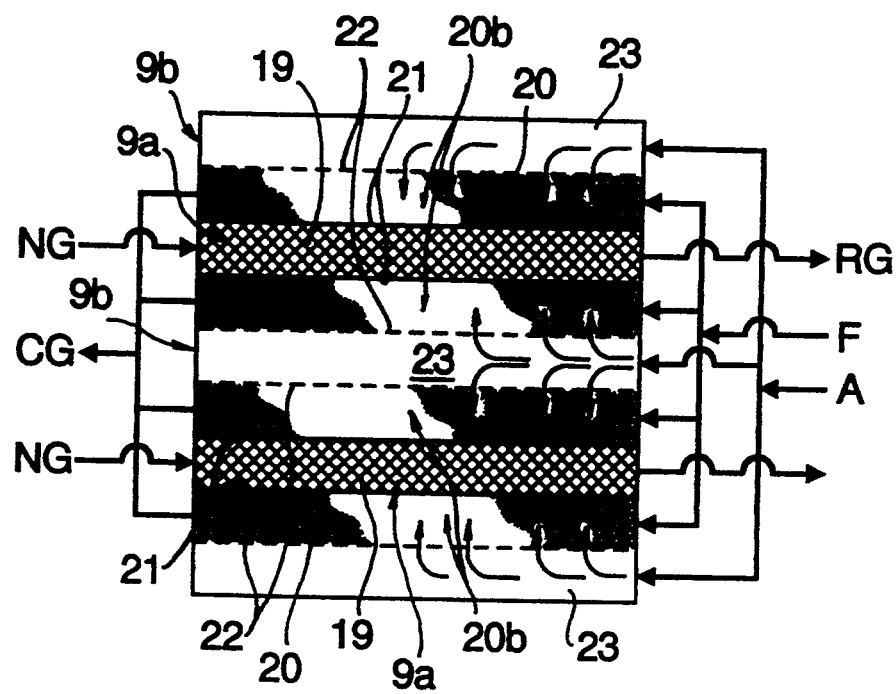
FIG. 5 depicts a conventional plate reformer.
Figure 6:
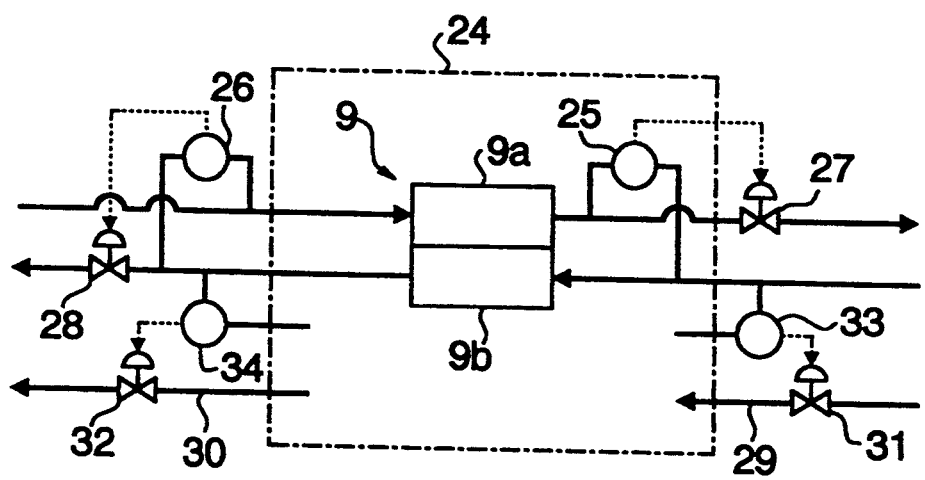
FIG. 6 depicts a conventional method of controlling a differential pressure of a reformer.

A plate reformer as shown in FIG. 5 is employed as the reformer 9 in this embodiment.

As illustrated in FIG. 1, the plate reformer 9 is housed in a pressure vessel 24, and the natural gas preheater 8 and the heat exchanger 13 are also housed in the pressure vessel 24.

A cathode exhaust gas line 35 is connected to an exit of the cathode 2 of the fuel cell FC and the air preheater 6 is connected to the line 35. On the line 35 downstream of the air preheater 6, provided are a pressure control valve 36 and a pressure controller 37 which controls the valve 36.

The branch line 12 extending between the heat exchanger 13 and the combustion chamber 9b of the reformer 9 has a check valve 38. On the line 12 upstream of the check valve 38, formed is an opening 39 which communicates the branch line 12 with the pressure vessel 24. Because of this opening 39, the air in the branch line 12 is allowed to enter the pressure vessel 24. The check valve 38 is provided on the branch line 12 to prevent a gas from reversely flowing into the pressure vessel 24 from the combustion chamber 9b via the opening 39.

A line 40 is connected to the pressure vessel 24 to lead $N_2$ gas to the vessel 24. As the air A is discharged into the pressure vessel 24 from the opening 39 of the line 12, an oxygen concentration is raised in the vessel 24 and this might cause explosion. To avoid such a situation, $N_2$ gas is introduced to the pressure vessel 24 and lowers the oxygen concentration.

A pressure of the cathode exhaust gas discharged from the cathode 2 is maintained to a certain constant value by the pressure control valve 36 on the cathode exhaust gas line 35. The air in the branch line 12 and the anode exhaust gas in the line 11 are both introduced to the combustion chamber 9b of the reformer 9 so that the pressures of these gases become equal to each other in the combustion chamber 9b. The pressure of the reforming chamber 9a is set a value higher than an inside pressure of the combustion chamber 9b by an anode pressure loss, a pressure loss at the natural gas preheater 8 and a pressure loss in the fuel feed line 10 between the reforming chamber 9a and the anode 3. However, these losses are negligibly small so that the pressure of the combustion chamber 9b and that of the reforming chamber 9a are substantially the same. As a result, large pressure difference does not appear between the combustion chamber 9b and the reforming chamber 9a. At the same time, it is possible to make the pressure of the anode 3 and that of the cathode 2 substantially the same.

When the inside pressure of the pressure vessel 24 is lower than that of the combustion chamber 9b, the air flows into the pressure vessel 24 from the opening 39 of the branch line is to make the inside pressure of the pressure vessel 24 and that of the combustion chamber 9b substantially equal to each other. Therefore, the inside pressure of the pressure vessel 24 becomes equal to that of the plate reformer 9. In other words, the inside pressures of the pressure vessel, combustion chamber 9b and reforming chamber 9a become substantially the same.

As the differential pressure adjustment is carried out by the air introduction to the pressure vessel 24, the oxygen concentration in the pressure vessel 24 is raised. At this point, if there is a hydrogen gas leakage, an explosion might occur. In consideration of this, an $N_2$ gas is always or occasionally fed into the pressure vessel 24 from the line 40 to reduce an amount of the air (or oxygen) introduced from the line 12.

Figure 2:
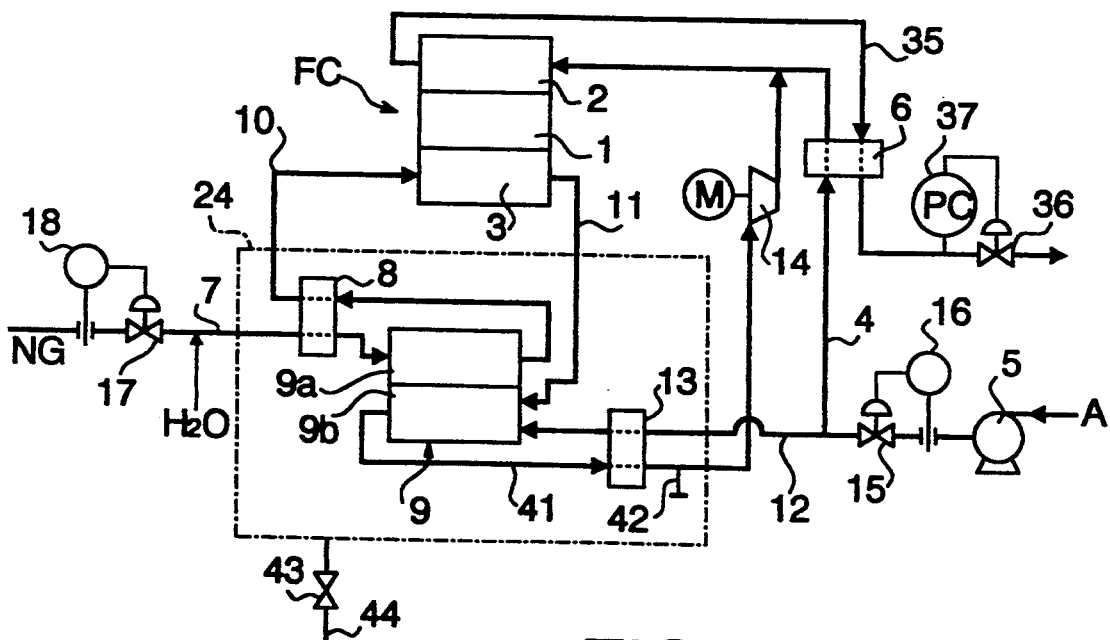
FIG. 2 shows an outline of another power generation system according to the present invention.

FIG. 2 illustrates another embodiment of the present invention. This power generation system has a structure similar to the one illustrated in FIG. 1 except the following points: the opening 39 is not formed in the branch line 12, the check valve 38 is not provided on the branch line 12 and the $N_2$ gas feed line 40 is not provided. Instead, an opening 42 is formed in the combustion exhaust gas line 41 to introduce the combustion exhaust gas into the pressure vessel 24 and a drain discharge line 44 is connected with the pressure vessel 24. A drain valve 43 is provided on the discharge line 44. By feeding the combustion exhaust gas into the pressure vessel 24, the pressure in the reforming chamber 9a, that in the combustion chamber 9b and that in the pressure vessel 24 become substantially equal to each other. Other elements of the power generation system of FIG. 2 are the same as those shown in FIG. 1.

In this embodiment, the pressure of the reforming chamber 9a and that of the combustion chamber 9b are substantially equal to each other and the inside pressure of the plate reformer 9 and that of the pressure vessel 24 are substantially equal to each other upon gas communication through the opening 42 of the combustion exhaust gas line 41. A water $H_2O$ is created upon reaction in the anode 3 and this water is contained in the combustion exhaust gas discharged from the combustion chamber 9b. As the combustion exhaust gas is introduced to the pressure vessel 24, the water may Flow into the pressure vessel 24 from the opening 42 and become a drain. To remove the drain, the drain discharge line 44 extends from the pressure vessel 24.

According to the embodiment illustrated in FIG. 2, the combustion exhaust gas whose oxygen concentration is low is introduced to the pressure vessel 24 so that a possibility of explosion upon leakage of $H_2$ into the pressure vessel 24 is reduced.

Figure 3:
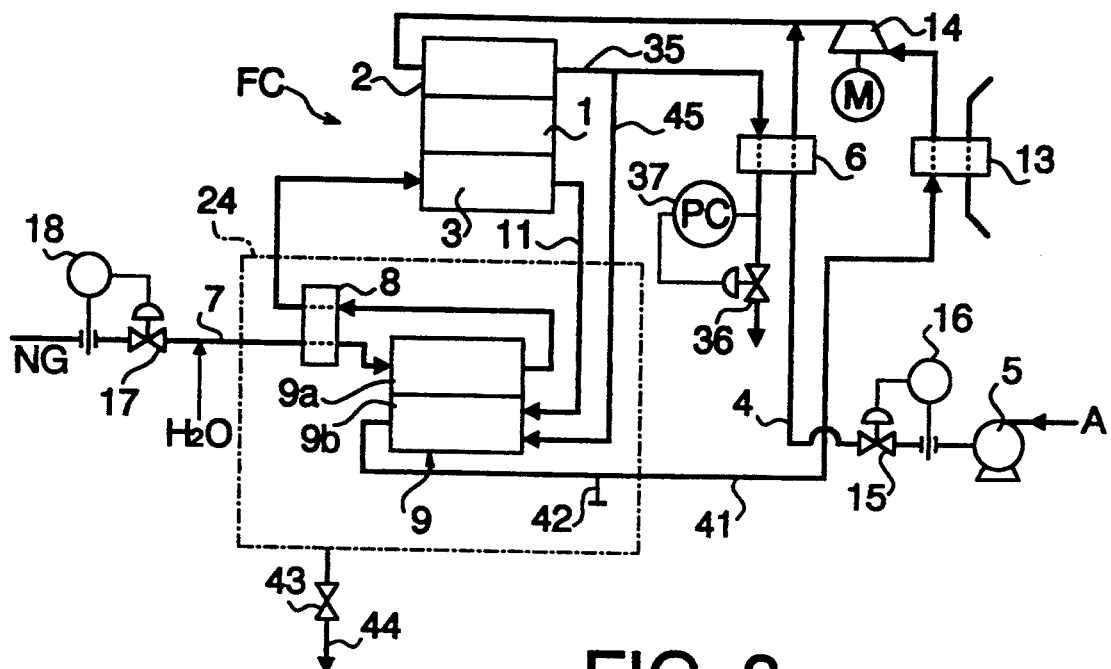
FIG. 3 illustrates a modification of the system shown in FIG. 2.

FIG. 3 shows a modification of the embodiment shown in FIG. 2. Instead of feeding the air into the combustion chamber 9b of the plate reformer 9 from the branch line 12 extending from the air feed line 4, a line 45 is branched from the cathode exhaust gas line 35 and connected with the combustion chamber 9b; part of the cathode exhaust gas is introduced to the combustion chamber 9b as a combustion gas. The opening 42 is formed on the combustion exhaust gas line 41 to feed the combustion exhaust gas into the pressure vessel 24, like the FIG. 2 embodiment.

According to the embodiment shown in FIG. 3, the pressure in the reforming chamber 9a and that in the combustion chamber 9b are adjusted to be equal to each other, and the pressure inside the reformer 9 and that outside the reformer 9 are adjusted to be equal to each other without differential pressure control depending on a valve, like those shown in FIGS. 1 and 2. In addition, since the cathode exhaust gas is directly introduced into the combustion chamber 9b, a sensible heat of the cathode exhaust gas can be used for the reformation in the reformer 9.

In the foregoing embodiments, only the plate reformer 9 is housed in the pressure vessel 24. However, both the reformer 9 and the fuel cell FC may be placed in the pressure vessel 24.

According to the present invention, as understood from the above, part of the air fed to the cathode and the anode exhaust gas or part of the cathode exhaust gas and the anode exhaust gas are introduced to the combustion chamber of the plate reformer such that the anode exhaust gas and the air or the anode exhaust gas and the cathode exhaust gas have the same pressure in the combustion chamber. Further, although the pressure in the reforming chamber which feeds the gas into the anode is set to a value higher than that in the combustion chamber due to a pressure loss at the anode and the like, the pressure loss is actually very small so that the pressure in the reforming chamber is substantially equal to that in the combustion chamber. Moreover, since the opening is formed in the line which feeds the air into the combustion chamber and this air line is communicated with the pressure vessel, the pressure in the pressure vessel is substantially equal to that in the combustion chamber. As a result, a large differential pressure is not created between the reforming chamber and the combustion chamber and between the inside and outside of the reformer housed in the pressure vessel. In addition, if the combustion exhaust gas from the combustion chamber is introduced into the pressure vessel, the oxygen concentration in the pressure vessel is not raised greatly and a possibility of explosion due to fuel leakage is reduced.

What is claimed is:

1. A method of controlling a differential pressure of a plate reformer installed in a fuel cell power generation system, a raw material gas being reformed to a fuel gas in a reforming chamber of the plate reformer, the fuel gas being fed to an anode of a fuel cell, an anode exhaust gas from the anode being fed to a combustion chamber of the plate reformer, and a combustion exhaust gas from the combustion chamber being fed to a cathode of the fuel cell together with an air, comprising the steps of:
   placing the plate reformer in a pressure vessel;
   maintaining a pressure of a cathode exhaust gas to a constant value;
   feeding part of the air to be fed to the cathode and the anode exhaust gas into the combustion chamber to make a pressure of the air and that of the anode exhaust gas substantially the same so as to make a pressure of the reforming chamber and that of the combustion chamber substantially the same;
   providing a branch line for feeding the air into the combustion chamber; and
   forming an opening on the branch line to allow the air to enter the pressure vessel so as to make the pressure of the reforming chamber, that of the combustion chamber and that of the pressure vessel substantially the same.

2. The method of claim 1, further including the step of feeding an $N_2$ gas into the pressure vessel such that an oxygen concentration in the pressure vessel which is raised by the air fed into the pressure vessel is suppressed below an explosion limit.

3. The method of claim 1, further including the step of providing a check valve on the branch line between the opening and the combustion chamber to prevent a gas in the combustion chamber from reversely flowing into the pressure vessel via the opening.

4. The method of claim 1, further including the step of feeding the combustion exhaust gas to the cathode using a recycle blower.

5. The method of claim 1, further including the step of controlling a flow rate of the raw material gas fed to the reforming chamber and a flow rate of the air fed to the combustion chamber and the cathode in such a manner that the pressure of the cathode exhaust gas is maintained to the constant value, whereby a pressure of the anode and that of the cathode are maintained to be substantially equal to each other.

6. A method of controlling a differential pressure of a plate reformer installed in a fuel cell power generation system, a raw material gas being reformed to a fuel gas in a reforming chamber of the plate reformer, the fuel gas being fed to an anode of a fuel cell, an anode exhaust gas from the anode being fed to a combustion chamber of the plate reformer, and a combustion exhaust gas from the combustion chamber being fed to a cathode of the fuel cell together with an air, comprising the steps of:
   placing the plate reformer in a pressure vessel;
   maintaining a pressure of a cathode exhaust gas to a constant value;
   feeding part of the air to be fed to the cathode and the anode exhaust gas into the combustion chamber to make a pressure of the air and that of the anode exhaust gas substantially the same so as to make a pressure of the reforming chamber and that of the combustion chamber substantially the same;
   providing a combustion exhaust gas line for feeding the combustion exhaust gas to the cathode from the combustion chamber; and
   forming an opening on the combustion exhaust gas line to allow the combustion exhaust gas to enter the pressure vessel so as to make the pressure of the reforming chamber, that of the combustion chamber and that of the pressure vessel substantially the same.

7. The method of claim 6, further including the step of draining a water off the pressure vessel when a steam in the combustion exhaust gas as fed into the pressure vessel condenses.

8. The method of claim 6, further including the step of providing a recycle blower for feeding the combustion exhaust gas to the cathode from the combustion chamber.

9. The method of claim 6, further including the step of controlling a flow rate of the raw material gas fed to the reforming chamber and a flow rate of the air fed to the combustion chamber and the cathode in such a manner that the pressure of the cathode exhaust gas is maintained to the constant value, whereby a pressure of the anode and that of the cathode are maintained to be substantially equal to each other.

10. A method of controlling a differential pressure of a plate reformer installed in a fuel cell power generation system, a raw material gas being reformed to a fuel gas in a reforming chamber of the plate reformer, the fuel gas being fed to an anode of a fuel cell, an anode exhaust gas from the anode being fed to a combustion chamber of the plate reformer, and a combustion exhaust gas from the combustion chamber being fed to a cathode of the fuel cell together with an air, comprising the steps of:
   placing the plate reformer in a pressure vessel;
   maintaining a pressure of the cathode exhaust gas to a constant value;
   feeding part of the cathode exhaust gas, which contains an air, and the anode exhaust gas into the combustion chamber to make a pressure of the cathode exhaust gas and that of the anode exhaust gas substantially the same so as to make a pressure of the reforming chamber and that of the combustion chamber substantially the same;
   providing a combustion exhaust gas line for feeding the combustion exhaust gas to the cathode from the combustion chamber; and
   forming an opening on the combustion exhaust gas line to allow the combustion exhaust gas to enter the pressure vessel so as to make the pressure of the reforming chamber, that of the combustion chamber and that of the pressure vessel substantially the same.

11. The method of claim 10, further including the step of draining a water off the pressure vessel when a steam in the combustion exhaust gas as fed into the pressure vessel condenses.

12. The method of claim 10, further including the step o providing a recycle blower for feeding the combustion exhaust gas to the cathode from the combustion chamber.

13. The method of claim 10, further including the step of controlling a flow rate of the raw material gas fed to the reforming chamber and a flow rate of the air fed to the combustion chamber and the cathode in such a manner that the pressure of the cathode exhaust gas is maintained to the constant value, whereby a pressure of the anode and that of the cathode are maintained to be substantially equal to each other.

14. An apparatus for controlling a differential pressure of a plate reformer installed in a fuel cell power generation system, a raw material gas being reformed to a fuel gas in a reforming chamber of the plate reformer, the fuel gas being fed to an anode of a fuel cell, an anode exhaust gas from the anode being fed to a combustion chamber of the plate reformer, a combustion exhaust gas from the combustion chamber being fed to a cathode of the fuel cell together with an air, and the air being fed to the cathode by an air line, comprising:
a pressure vessel for housing the plate reformer;
pressure control means for maintaining a pressure of a cathode exhaust gas to a constant value;
pressure equalizing means for making a pressure of the reforming chamber and that of the combustion chamber substantially the same, the pressure equalizing means including
a line branched from the air line for feeding part of the
air into the combustion chamber, and
an anode exhaust gas line connecting an exit of the anode
with the combustion chamber for feeding the anode exhaust
gas into the combustion chamber; and
opening means provided on the branched line for allowing the air in the branched line to enter the pressure vessel so as to make the pressure of the reforming chamber, that of the combustion chamber and that of the pressure vessel substantially the same.

15. The apparatus of claim 14, further including means connected with the pressure vessel for feeding an $N_2$ gas into the pressure vessel.

16. The apparatus of claim 14, further including a check valve connected with the branched line extending between the opening means and the combustion chamber.

17. An apparatus for controlling a differential pressure of a plate reformer installed in a fuel cell power generation system, a raw material gas being reformed to a fuel gas in a reforming chamber of the plate reformer, the fuel gas being fed to an anode of a fuel cell, an anode exhaust gas from the anode being fed to a combustion chamber of the plate reformer, a combustion exhaust gas from the combustion chamber being fed to a cathode of the fuel cell together with an air, and the air being fed to the cathode by an air line, comprising:
a pressure vessel for housing the plate reformer;
pressure control means for maintaining a pressure of a cathode exhaust gas to a constant value;
pressure equalizing means for making a pressure of the reforming chamber and that of the combustion chamber substantially the same, the pressure equalizing means including
a line branched from the air line for feeding part of the
air into the combustion chamber, and
an anode exhaust gas line connecting the anode with the
combustion chamber for feeding the anode exhaust gas to the
combustion chamber;
a combustion exhaust gas line for connecting the combustion chamber with the cathode; and
opening means provided on the combustion exhaust line for allowing the combustion exhaust gas to enter the pressure vessel so as to make the pressure of the reforming chamber, that of the combustion chamber and that of the pressure vessel substantially the same.

18. The apparatus of claim 17, further including means for draining a water off the pressure vessel.

19. An a apparatus for controlling a differential pressure of a plate reformer installed in a fuel cell power generation system, a raw material gas being reformed to a fuel gas in a reforming chamber of the plate reformer, the fuel gas being fed to an anode of a fuel cell, an anode exhaust gas from the anode being fed to a combustion chamber of the plate reformer, a combustion exhaust gas from the combustion chamber being fed to a cathode of the fuel cell together with an air, and the air being fed to the cathode by an air line, comprising:
a pressure vessel for housing the plate reformer;
pressure control means for maintaining a pressure of the cathode exhaust gas to a constant value;
pressure equalizing means for making a pressure of the reforming chamber and that of the combustion chamber substantially the same, the pressure equalizing means including
a line branched from a cathode exhaust gas line for feeding
the cathode exhaust gas, which includes an air, to the
combustion chamber, and
an anode exhaust gas line connecting the anode with the
combustion chamber for feeding the anode exhaust gas to the
combustion chamber; and
a combustion exhaust gas line extending between the combustion chamber and the cathode; and
opening means provided on the combustion exhaust gas line for allowing the combustion exhaust gas in the combustion exhaust gas line to enter the pressure vessel to make the pressure of the reforming chamber, that of the combustion chamber and that of the pressure vessel substantially the same.

20. The apparatus of claim 19 further including means for draining a water off the pressure vessel.

* * * * *